(12) United States Patent
Ueno et al.

(10) Patent No.: US 12,176,479 B2
(45) Date of Patent: Dec. 24, 2024

(54) ALL-SOLID-STATE BATTERY

(71) Applicant: TDK CORPORATION, Tokyo (JP)

(72) Inventors: Tetsuya Ueno, Tokyo (JP); Gakuho Isomichi, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 481 days.

(21) Appl. No.: 16/969,048

(22) PCT Filed: Mar. 27, 2019

(86) PCT No.: PCT/JP2019/013095
§ 371 (c)(1),
(2) Date: Aug. 11, 2020

(87) PCT Pub. No.: WO2019/189311
PCT Pub. Date: Oct. 3, 2019

(65) Prior Publication Data
US 2021/0036362 A1 Feb. 4, 2021

(30) Foreign Application Priority Data

Mar. 28, 2018 (JP) ................................. 2018-062460

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/366* (2013.01); *H01M 4/661* (2013.01);
(Continued)

(58) Field of Classification Search
CPC .. H01M 10/0562; H01M 4/366; H01M 4/661; H01M 10/0525; H01M 2004/027; H01M 2004/028
See application file for complete search history.

(56) References Cited

U.S. PATENT DOCUMENTS 11,289,748 B2 * 3/2022 Li ........................... H01G 11/06
2009/0202912 A1 8/2009 Baba et al.
(Continued)

FOREIGN PATENT DOCUMENTS

CN 106935821 * 7/2017 ............. H01M 4/36
JP 2003-272610 A 9/2003
(Continued)

OTHER PUBLICATIONS

Chaofeng Liu, et al., A promising cathode for Li-ion batteries, Feb. 13, 2016, Elsevier, Energy Storage Materials 4, p. 29 (Year: 2016).*
(Continued)

*Primary Examiner* — Matthew T Martin
*Assistant Examiner* — Taylor Harrison Krone
(74) *Attorney, Agent, or Firm* — Oliff PLC

(57) ABSTRACT

An all-solid-state battery includes a positive electrode current collector layer; a positive electrode active material layer; a negative electrode current collector layer; a negative electrode active material layer; a solid electrolyte layer disposed between the positive electrode active material layer and the negative electrode active material layer and formed of a solid electrolyte; and at least one of a first intermediate layer formed between the positive electrode current collector layer and the positive electrode active material layer, and a second intermediate layer formed between the negative electrode current collector layer and the negative electrode active material layer.

8 Claims, 3 Drawing Sheets

(51) Int. Cl.
*H01M 4/36* (2006.01)
*H01M 4/66* (2006.01)
*H01M 10/0525* (2010.01)

(52) U.S. Cl.
CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2012/0208092 A1* | 8/2012 | Ku | H01G 11/04 429/231.95 |
| 2016/0254545 A1 | 9/2016 | Sugita et al. | |
| 2018/0254519 A1* | 9/2018 | Maeda | H01M 10/052 |
| 2019/0088981 A1* | 3/2019 | Chen | H01M 4/13 |
| 2019/0135644 A1* | 5/2019 | Ito | C04B 35/447 |
| 2019/0181446 A1* | 6/2019 | Hayashi | H01M 4/1397 |
| 2019/0267664 A1* | 8/2019 | Lin | H01M 4/661 |

FOREIGN PATENT DOCUMENTS

| | | | | |
|---|---|---|---|---|
| JP | 2009-170183 A | 7/2009 | | |
| JP | 2012-164751 A | 8/2012 | | |
| JP | 5512293 B2 | 6/2014 | | |
| JP | 2014-179242 A | 9/2014 | | |
| JP | 2015220096 A | * 12/2015 | | Y02P 70/50 |
| JP | 2016-164868 A | 9/2016 | | |
| WO | 2007/135790 A1 | 11/2007 | | |
| WO | 2013/051664 A1 | 4/2013 | | |
| WO | WO-2014141962 A1 | * 9/2014 | | H01B 1/06 |

OTHER PUBLICATIONS

Jun. 25, 2019 International Search Report issued in International Patent Application No. PCT/JP2019/013095.
Translation of Sep. 26, 2023 Office Action issued in Chinese Application No. 201980019303.9.
Translation of Dec. 6, 2022 Office Action issued in Japanese Application No. 2020-509163.
Translation of Feb. 20, 2024 Office Action issued in Chinese Patent Application No. 201980019303.9.
Translation of Feb. 27, 2024 Office Action issued in Japanese Patent Application No. 2020-509163.
Dec. 8, 2023 Office Action issued in German Patent Application No. 112019001591.5.

* cited by examiner

ALL-SOLID-STATE BATTERY

TECHNICAL FIELD

The present invention relates to an all-solid-state battery.
Priority is claimed on Japanese Patent Application No. 2018-62460, filed Mar. 28, 2018, the content of which is incorporated herein by reference.

BACKGROUND ART

In recent years, lithium ion secondary batteries have come to be widely used as power supplies for mobile communication devices such as cellular phones, smartphones, or the like, and small portable electronic devices such as laptop computers, tablet PCs, game machines, or like. A lithium ion secondary battery used in such small portable electronic devices is required to be made smaller, thinner and more reliable. In order to drive these electronic devices for a long time, research and development on increasing the lifetime and increasing the capacity of lithium ion secondary batteries is being actively conducted.

Known lithium ion secondary batteries are those that use an organic electrolyte solution and those that use a solid electrolyte for an electrolyte. In the related art, a lithium ion secondary battery using an organic electrolyte solution for the electrolyte has a positive electrode and a negative electrode that are obtained by coating a positive electrode active material or a negative electrode active material that occludes and discharges lithium ions on both surfaces of a sheet-shaped current collector formed of aluminum, copper, or the like, and is formed by forming a wound body that is wound a plurality of times with a separator sandwiched between the positive electrode and the negative electrode and enclosing the wound body in an exterior body having a shape such as a cylinder type, a square type, a coin type, or the like, together with an electrolyte solution.

In such a lithium ion secondary battery, a combustible organic solvent is contained in the electrolytic solution, and an unexpected excessive impact or the like may cause liquid spillage or abnormal heat due to generation of a short-circuit. For this reason, there is a demand for a safer product.

In comparison with a lithium ion secondary battery using an organic electrolyte solution, a lithium ion secondary battery (an all-solid-state battery) using a solid electrolyte for the electrolyte has an advantage that a degree of freedom in design of the battery shape is high and it is easy to make the battery a smaller size and thinner, and since an electrolytic solution is not contained therein, reliability is high while liquid spillage, abnormal heat, or the like, does not occur.

All-solid-state batteries are mainly classified into two types, i.e., a thin film type and a bulk type.

The thin film type is fabricated by a thin film technique such as a PVD method, a sol-gel method, or the like, and the bulk type is fabricated through powder molding of an electrode active material or a sulfide-based solid electrolyte.

However, the thin film type has problems that a battery capacity may be small because the active material layer is thick and good lamination of films is difficult or manufacturing costs high.

Meanwhile, since a sulfide-based solid electrolyte is used for the bulk type and hydrogen sulfide is generated when the sulfide-based solid electrolyte reacts with water, there is a need to fabricate a battery in a glove box in which a dew point is managed. In addition, since it is difficult to make the sulfide solid electrolyte into a sheet, thinning of the solid electrolyte layer or high stacking of the battery is needed.

In consideration of the above-mentioned problems, Patent Document 1 and Patent Document 2 disclose a method of manufacturing an all-solid-state battery that can be mass-produced and that can be industrially adopted, the method including making members into sheets, stacking the sheets, and simultaneously baking the sheets using an oxide-based solid electrolyte that is stable in the air.

In addition, Patent Document 2 discloses a manufacturing method that is capable of simplifying a manufacturing process and a mounting process of a battery and is effective in reduction of manufacturing costs with no necessity of distinguishing between terminal electrodes because a non-polar all-solid-state battery is realized by forming the first electrode layer and the second electrode layer of the same active material and stacking the layers with an electrolyte region interposed therebetween.

CITATION LIST

Patent Literature

[Patent Document 1] Republished Japanese Translation No. WO2007/135790 of the PCT International Publication for Patent Applications
[Patent Document 2] Japanese Patent No. 5512293

SUMMARY OF INVENTION

Technical Problem

While manufacturing methods that enable mass production are disclosed in Patent Document 1 or Patent Document 2, bonding between the positive electrode current collector and the positive electrode active material or between the negative electrode current collector and the negative electrode active material is insufficient, and unbonded sections may exist. For this reason, a local electrochemical reaction may occur, and cycling characteristics may be deteriorated.

In consideration of the above-mentioned problems, the present invention is directed to providing an all-solid-state battery having excellent cycling characteristics.

Solution to Problem

An all-solid-state battery according to the present invention includes: a positive electrode current collector layer; a positive electrode active material layer; a negative electrode current collector layer; a negative electrode active material layer; a solid electrolyte layer disposed between the positive electrode active material layer and the negative electrode active material layer and formed of a solid electrolyte; and at least one of a first intermediate layer formed between the positive electrode current collector layer and the positive electrode active material layer, and a second intermediate layer formed between the negative electrode current collector layer and the negative electrode active material layer.

According to this configuration, since the first intermediate layer formed between the positive electrode current collector layer and the positive electrode active material layer, and the second intermediate layer formed between the negative electrode current collector layer and the negative electrode active material layer are provided, bonding between the positive electrode current collector and the positive electrode active material or between the negative electrode current collector and the negative electrode active material can be improved, and unbonded sections can be reduced. Accordingly, localization of an electrochemical reaction during charge or discharge can be reduced, a reaction between the positive electrode active material and the negative electrode active material can occur uniformly, and cycling characteristics can be improved.

In the all-solid-state battery according to the present invention, a bonding rate by which the first intermediate layer or the second intermediate layer is bonded to the positive electrode current collector layer or the negative electrode current collector layer is preferably greater than 1%.

According to this configuration, since the bonding rate by which the first intermediate layer or the second intermediate layer is bonded to the positive electrode current collector layer or the negative electrode current collector layer is larger than 1%, the bonding between the positive electrode current collector layer and the first intermediate layer or between the negative electrode current collector layer and the second intermediate layer can be further improved. Accordingly, an unbonded section between the positive electrode current collector layer and the positive electrode active material layer or between the negative electrode current collector layer and the negative electrode active material layer can be further reduced, localization of an electrochemical reaction during charge or discharge can be further reduced, a reaction between the positive electrode active material and the negative electrode active material can uniformly occur, and cycling characteristics can be further improved.

In the all-solid-state battery according to the present invention, the bonding rate is preferably greater than 30%.

According to this configuration, since the bonding rate by which the first intermediate layer or the second intermediate layer is bonded to the positive electrode current collector layer or the negative electrode current collector layer is larger than 30%, the bonding between the positive electrode current collector layer and the first intermediate layer or between the negative electrode current collector layer and the second intermediate layer can be further improved. Accordingly, an unbonded section between the positive electrode current collector layer and the positive electrode active material layer or between the negative electrode current collector layer and the negative electrode active material layer can be further reduced, localization of an electrochemical reaction during charge or discharge can be further reduced, a reaction between the positive electrode active material and the negative electrode active material can uniformly occur, and cycling characteristics can be further improved.

In the all-solid-state battery according to the present invention, the first intermediate layer 56 or the second intermediate layer 57 may be amorphous.

According to this configuration, since the first intermediate layer or the second intermediate layer is amorphous, the bonding between the positive electrode current collector layer and the positive electrode active material layer or between the negative electrode current collector layer and the negative electrode active material layer, which are softened, can be more appropriately formed, and unbonded sections can be further reduced. Accordingly, localization of an electrochemical reaction during charge or discharge can be further reduced, a reaction between the positive electrode active material and the negative electrode active material can uniformly occur, and cycling characteristics can be further improved.

In the all-solid-state battery according to the present invention, at least one of the first intermediate layer and the second intermediate layer may contain a constituent material including at least an anion.

According to this configuration, since the first intermediate layer and the second intermediate layer include at least an anion, surfaces of constituent materials that constitute the positive electrode current collector layer or the negative electrode current collector layer, and the positive electrode active material layer or the negative electrode active material layer are easily coupled to the anion contained in the first intermediate layer and the second intermediate layer, and the bonding between the positive electrode current collector layer and the first intermediate layer, between the negative electrode current collector layer and the second intermediate layer, between the positive electrode active material layer and the first intermediate layer, and between the negative electrode active material layer and the second intermediate layer can be further improved. Accordingly, bonding between the positive electrode current collector layer and the positive electrode active material layer or between the negative electrode current collector layer and the negative electrode active material layer can be more appropriately formed, the unbonded section can be further reduced, localization of an electrochemical reaction during charge or discharge can be further reduced, a reaction between the positive electrode active material and the negative electrode active material can uniformly occur, and cycling characteristics can be further improved.

In the all-solid-state battery according to the present invention, at least one of the first intermediate layer and the second intermediate layer is preferably an amorphous material including at least one element selected from the group consisting of Li, V, Si, Al, Ge, Sb, Sn, Ga, In, Fe, Co, Ni, Ti, Mn, Ca, Ba, La, Zr, Ce, Cu, Mg, Sr, Cr, Mo, Nb, Zn and P.

According to this configuration, since at least one of the first intermediate layer and the second intermediate layer is an amorphous material including at least one element selected from the group consisting of Li, V, Si, Al, Ge, Sb, Sn, Ga, In, Fe, Co, Ni, Ti, Mn, Ca, Ba, La, Zr, Ce, Cu, Mg, Sr, Cr, Mo, Nb, Zn and P, the first intermediate layer that appropriately bonds the positive electrode current collector layer and the positive electrode active material layer or the second intermediate layer that appropriately bonds the negative electrode current collector layer and the negative electrode active material layer can be provided with an electrical conducting function, a more uniform electrochemical reaction can occur. Accordingly, cycling characteristics can be further improved.

A thickness of the first intermediate layer or the second intermediate layer is preferably 0.1 µm or more and 10 µm or less.

According to this configuration, since the thickness of the first intermediate layer or the second intermediate layer is 0.1 µm more and 10 µm or less, an increase in resistance due to provision of the first intermediate layer that appropriately bonds the positive electrode current collector layer and the positive electrode active material layer or the second intermediate layer that appropriately bonds the negative electrode current collector layer and the negative electrode active material layer can be minimized, and a more uniform electrochemical reaction can occur. Accordingly, cycling characteristics can be further improved.

Advantageous Effects of Invention

According to the present invention, since a structure including at least one of the first intermediate layer formed between the positive electrode current collector layer and the positive electrode active material layer and the second intermediate layer formed between the negative electrode current collector layer and the negative electrode active material layer is provided, it is possible to provide an all-solid-state battery with excellent cycling characteristics.

BEST MODE FOR CARRYING OUT THE INVENTION

Figure 1:
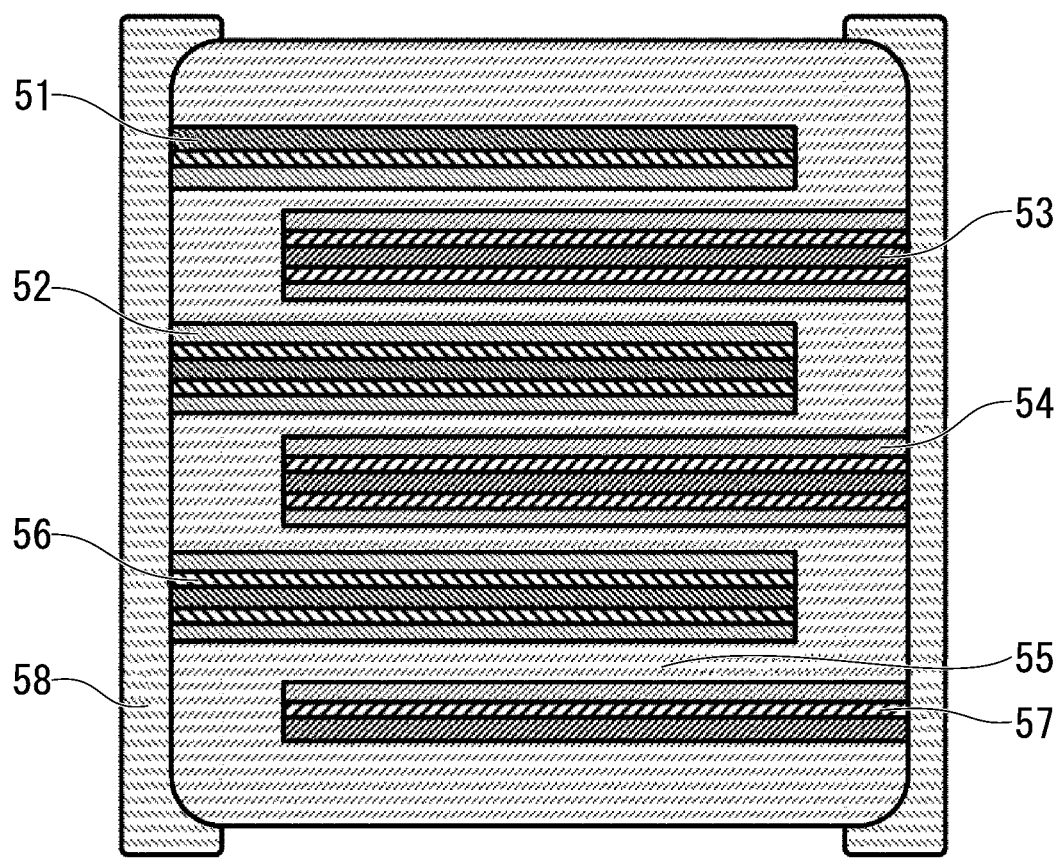
FIG. 1 is a cross-sectional view showing an all-solid-state battery according to an embodiment of the present invention.

Hereinafter, the present invention will be appropriately described in detail with reference to the accompanying drawings. In the drawings used in the following description, in order to make characteristics of the present invention easier to understand, features may be enlarged for convenience, and dimensional ratios of components may be different from actual ones. Materials, dimensions, or the like, provided in the following description are exemplary examples, and the present invention is not limited thereto and may be variously modified and realized without departing from the spirit of the present invention.

FIG. 1 is a cross-sectional view of an all-solid-state battery according to an embodiment of the present invention. As shown in FIG. 1, an all-solid-state battery 50 has one or more electricity storage parts each constituted by a positive electrode current collector layer 51, a positive electrode active material layer 52, a negative electrode current collector layer 53, a negative electrode active material layer 54, a solid electrolyte layer 55, a first intermediate layer 56, a second intermediate layer 57, and terminal electrodes 58, and has a structure in which these are stacked.

Specifically, the all-solid-state battery 50 includes the positive electrode current collector layer 51, the positive electrode active material layer 52 provided on the positive electrode current collector layer 51, the negative electrode current collector layer 53, the negative electrode active material layer 54 provided on the negative electrode current collector layer 53, the solid electrolyte layer 55 disposed between the positive electrode active material layer 52 and the negative electrode active material layer 54 and formed of a solid electrolyte, and at least one of: the first intermediate layer 56 formed between the positive electrode current collector layer 51 and the positive electrode active material layer 52; and the second intermediate layer 57 formed between the negative electrode current collector layer 53 and the negative electrode active material layer 54.

According to this configuration, since the first intermediate layer 56 formed between the positive electrode current collector layer 51 and the positive electrode active material layer 52, and the second intermediate layer 57 formed between the negative electrode current collector layer 53 and the negative electrode active material layer 54 are provided, bonding between the positive electrode current collector and the positive electrode active material or between the negative electrode current collector and the negative electrode active material can be appropriately performed, and an unbonded section can be reduced. Accordingly, localization of the electrochemical reaction during charge or discharge can be reduced, a reaction between the positive electrode active material and the negative electrode active material can be uniformly generated, and cycling characteristics can be improved.

In addition, an intermediate layer configured to attenuate a coefficient of thermal expansion may be provided at at least one of between the positive electrode active material layer 52 and the solid electrolyte layer 55 and between the negative electrode active material layer 54 and the solid electrolyte layer 55.

The positive electrode active material layer 52 is provided on at least one side or the two sides of the positive electrode current collector layer 51.

The first intermediate layer 56 is continuously or discontinuously provided between the positive electrode active material layer 52 and the positive electrode current collector layer 51.

The negative electrode active material layer 54 is provided on at least one side or both sides of the negative electrode current collector layer 53.

The second intermediate layer 57 is continuously or discontinuously provided between the negative electrode active material layer 54 and the negative electrode current collector layer 53.

The positive electrode current collector layer 51 and the negative electrode current collector layer 53 are connected to the terminal electrodes 58 that are different from each other, respectively. This is because the layers are electrically connected to the exterior.

Figure 2:
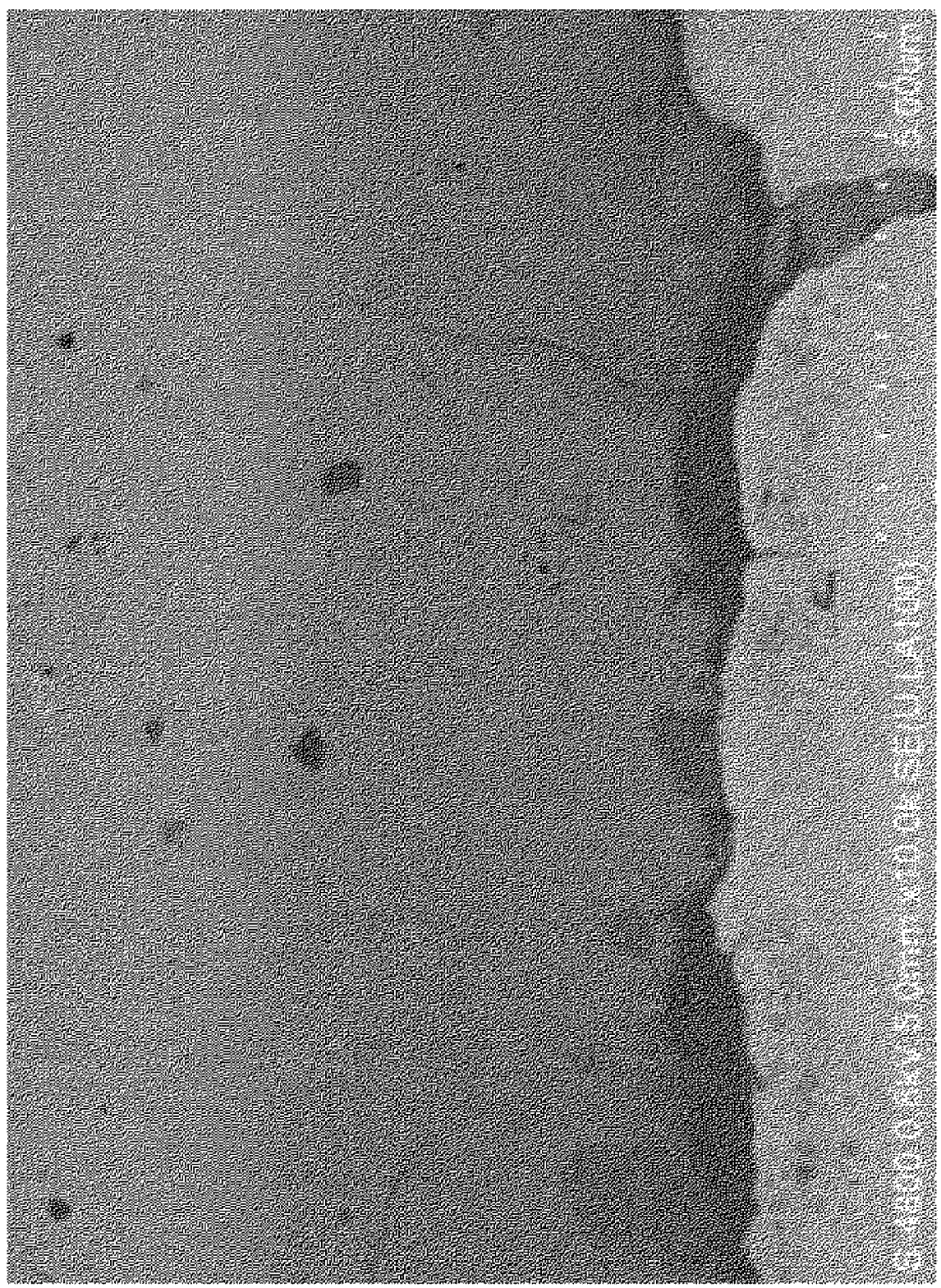
FIG. 2 is a cross-sectional SEM image in the vicinity of a positive electrode current collector layer showing the all-solid-state battery of the embodiment.

In addition, FIG. 2 shows a cross-sectional SEM image in the vicinity of the positive electrode current collector layer of the all-solid-state battery according to the embodiment as a representative showing an intermediate layer. As shown in FIG. 2, it will be appreciated that a first intermediate layer is provided between the positive electrode current collector layer and the positive electrode active material layer.

Figure 3:
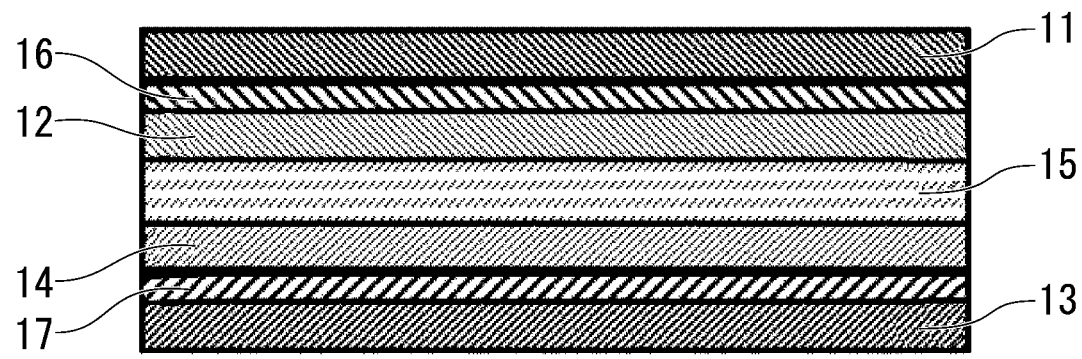
FIG. 3 is a cross-sectional view showing an electricity storage part of the all-solid-state battery of the embodiment.

FIG. 3 is a cross-sectional view showing an electricity storage part according to the embodiment. As shown in FIG. 3, an electricity storage part 10 is constituted by a positive electrode current collector layer 11, a positive electrode active material layer 12, a negative electrode current collector layer 13, a negative electrode active material layer 14, a solid electrolyte layer 15, a first intermediate layer 16, and a second intermediate layer 17, and has a structure in which they are stacked.

Specifically, the electricity storage part 10 includes the positive electrode current collector layer 11, the positive electrode active material layer 12 provided on the positive electrode current collector layer 11, the negative electrode current collector layer 13, the negative electrode active material layer 14 provided on the negative electrode current collector layer 13, the solid electrolyte layer 15 disposed between the positive electrode active material layer 12 and the negative electrode active material layer 14 and formed of a solid electrolyte, and at least one of: the first intermediate layer 16 formed between the positive electrode current collector layer 11 and the positive electrode active material layer 12; and the second intermediate layer 17 formed between the negative electrode current collector layer 13 and the negative electrode active material layer 14.

According to this configuration, since the first intermediate layer 16 formed between the positive electrode current collector layer 11 and the positive electrode active material layer 12, and the second intermediate layer 17 formed between the negative electrode current collector layer 13 and the negative electrode active material layer 14 are provided, bonding between the positive electrode current collector and the positive electrode current collector active material or between the negative electrode current collector and the negative electrode active material can be appropriately performed, and an unbonded section can be reduced. Accordingly, localization of the electrochemical reaction during charge or discharge can be reduced, a reaction between the positive electrode active material and the negative electrode active material can be uniformly generated, and cycling characteristics can be improved.

In the all-solid-state battery 50 according to the embodiment, a bonding rate by which the first intermediate layers 56 and 16 or the second intermediate layers 57 and 17 are bonded to the positive electrode current collector layers 51 and 11 or the negative electrode current collector layers 53 and 13 is preferably larger than 1%.

According to this configuration, since a proportion by which the first intermediate layers 56 and 16 or the second intermediate layers 57 and 17 are bonded to the positive electrode current collector layers 51 and 11 or the negative electrode current collector layers 53 and 13 is larger than 1%, bonding between the positive electrode current collector layers 51 and 11 and the first intermediate layers 56 and 16 or between the negative electrode current collector layers 53 and 13 and the second intermediate layers 57 and 17 can be more appropriately performed. Accordingly, an unbonded section between the positive electrode current collector layers 51 and 11 and the positive electrode active material layers 52 and 12 or between the negative electrode current collector layers 53 and 13 and the negative electrode active material layers 54 and 14 can be further reduced, localization of the electrochemical reaction during charge or discharge can be further reduced, a reaction between the positive electrode active material and the negative electrode active material can be uniformly generated, and cycling characteristics can be further improved.

In the all-solid-state battery 50 according to the embodiment, the bonding rate is preferably larger than 30%.

According to this configuration, since the proportion that the first intermediate layers 56 and 16 or the second intermediate layers 57 and 17 are bonded to the positive electrode current collector layers 51 and 11 or the negative electrode current collector layers 53 and 13 is larger than 30%, the bonding between the positive electrode current collector layers 51 and 11 and the first intermediate layers 56 and 16 or between the negative electrode current collector layers 53 and 13 and the second intermediate layers 57 and 17 can be more appropriately performed. Accordingly, the unbonded section between the positive electrode current collector layers 51 and 11 and the positive electrode active material layers 52 and 12 or between the negative electrode current collector layers 53 and 13 and the negative electrode active material layers 54 and 14 can be further reduced, localization of the electrochemical reaction during charge or discharge can be further reduced, a reaction between the positive electrode active material and the negative electrode active material can be uniformly generated, and cycling characteristics can be further improved.

In the all-solid-state battery 50 according to the embodiment, the first intermediate layers 56 and 16 or the second intermediate layers 57 and 17 may be amorphous.

According to this configuration, since the first intermediate layers 56 and 16 or the second intermediate layers 57 and 17 are amorphous, the bonding between the positive electrode current collector layers 51 and 11 and the positive electrode active material layers 52 and 12 or between the negative electrode current collector layers 53 and 13 and the negative electrode active material layers 54 and 14, which are softened, can be more appropriately formed, and the unbonded section can be further reduced. Accordingly, localization of the electrochemical reaction during charge or discharge can be further reduced, a reaction between the positive electrode active material and the negative electrode active material can be uniformly generated, and cycling characteristics can be further improved.

Further, "amorphous" in the application means powder in which a clear diffraction phenomenon is not confirmed when the same amount of powder is analyzed by an X-ray diffraction device.

In the all-solid-state battery 50 according to the embodiment, at least one of the first intermediate layers 56 and 16 and the second intermediate layers 57 and 17 preferably contain a constituent material including at least an anion.

According to this configuration, since at least one of the first intermediate layers 56 and 16 and the second intermediate layers 57 and 17 includes at least an anion, surfaces of constituent materials that constitute the positive electrode current collector layers 51 and 11 or the negative electrode current collector layers 53 and 13, and the positive electrode active material layers 52 and 12 or the negative electrode active material layers 54 and 14, and the anions included in the first intermediate layers 56 and 16 and the second intermediate layers 57 and 17 are easily bonded to each other, and the bonding between the positive electrode current collector layers 51 and 11 and the first intermediate layers 56 and 16 or between the negative electrode current collector layers 53 and 13 and the second intermediate layers 57 and 17, and between the positive electrode active material layers 52 and 12 and the first intermediate layers 56 and 16 or between the negative electrode active material layers 54 and 14 and the second intermediate layers 57 and 17 can be more appropriately performed. Accordingly, the bonding between the positive electrode current collector layers 51 and 11 and the positive electrode active material layers 52 and 12 or between the negative electrode current collector layers 53 and 13 and the negative electrode active material layers 54 and 14 can be more appropriately formed, the unbonded section can be further reduced, localization of the electrochemical reaction during charge or discharge can be further reduced, a reaction between the positive electrode active material and the negative electrode active material can be uniformly generated, and cycling characteristics can be further improved.

In the all-solid-state battery 50 according to the embodiment, the first intermediate layers 56 and 16 preferably contain at least one constituent material of the constituent material of the positive electrode current collector layers 51 and 11 and the constituent material of the positive electrode active material layers 52 and 12.

According to this configuration, since the first intermediate layers 56 and 16 contain at least one constituent material of the constituent material of the positive electrode current collector layers 51 and 11 and the constituent material of the positive electrode active material layers 52 and 12, the bonding between the positive electrode current collector layers 51 and 11 and the positive electrode active material layers 52 and 12 can be more appropriately performed, and the unbonded section can be further reduced. Accordingly, localization of the electrochemical reaction during charge or discharge can be further reduced, a reaction with the positive electrode active material can be uniformly generated, and it is preferable from viewpoints that an all-solid-state battery having a high cycle lifetime is obtained.

In the all-solid-state battery 50 according to the embodiment, the second intermediate layers 57 and 17 preferably have at least one constituent material of the constituent material of the negative electrode current collector layers 53 and 13 and the constituent material of the negative electrode active material layers 54 and 14.

According to this configuration, since the second intermediate layers 57 and 17 contain at least one constituent material of the constituent material of the negative electrode current collector layers 53 and 13 and the constituent material of the negative electrode active material layers 54 and 14, the bonding between the negative electrode current collector layers 53 and 13 and the negative electrode active material layers 54 and 14 can be more appropriately performed, and the unbonded section can be further reduced. Accordingly, localization of the electrochemical reaction during charge or discharge can be further reduced, a reaction with the negative electrode active material can be uniformly generated, and it is preferable from viewpoints that the all-solid-state battery having a high cycle lifetime is obtained.

In the all-solid-state battery 50 according to the embodiment, a relative density is preferably 80% or more.

According to this configuration, since an all-solid-state battery having a relative density of 80% or more is provided, the unbonded section of each layer of the positive electrode current collector layers 51 and 11, the first intermediate layers 56 and 16, the positive electrode active material layers 52 and 12, the solid electrolyte layers 55 and 15, the negative electrode active material layers 54 and 14, the second intermediate layers 57 and 17, and the negative electrode current collector layers 53 and 13 can be reduced. Accordingly, localization of the electrochemical reaction during charge or discharge can be reduced, a reaction between the positive electrode active material and the negative electrode active material can be uniformly generated, and it is preferable from viewpoints that the all-solid-state battery having a high cycle lifetime is obtained.

While compositions of the positive electrode current collector layers 51 and 11 and the negative electrode current collector layers 53 and 13 are not particularly limited, for example, a positive electrode active material, a negative electrode active material, a solid electrolyte, or a sintering additive may be included, in addition to a current collector material.

While the compositions of the positive electrode active material layers 52 and 12 and the negative electrode active material layers 54 and 14 are not particularly limited, for example, a lithium ion conductive assistant, a sintering additive, or a conducting aid may be included, in addition to the positive electrode active material and the negative electrode active material.

While the compositions of the solid electrolyte layers 55 and 15 are not particularly limited, for example, a sintering additive may be included, in addition to the solid electrolyte.

The positive electrode active material or the negative electrode active material that constitutes the positive electrode active material layers 52 and 12 or the negative electrode active material layers 54 and 14 can utilize a compound exhibiting a more electropositive potential as a positive electrode active material on the positive electrode active material layers 52 and 12 and using compound showing a more electronegative potential as a negative electrode active material on the negative electrode active material layers 54 and 14 than the electric potential of the compound thereof. In addition, the positive electrode active material layers 52 and 12 and the negative electrode active material layers 54 and 14 may be constituted by one type of compound.

(Solid Electrolyte)

As the solid electrolyte that constitutes the solid electrolyte layers 55 and 15 of the all-solid-state battery of the embodiment, a material having low electron conductivity and high lithium ion conductivity is preferably used. For example, the material is desirably at least one selected from the group consisting of perovskite type compounds such as $La_{0.5}Li_{0.5}TiO_3$ or the like, LISICON type compounds such as $Li_{14}Zn(GeO_4)_4$ or the like, garnet type compounds such as $Li_7La_3Zr_2O_{12}$ or the like, phosphate compounds such as $LiTi_2(PO_4)_3$, $LiGe_2(PO_4)_3$, $LiZr_2(PO_4)_3$ (monoclinic), $LiZr_2(PO_4)_3$ (rhombohedral), $Li_{1.5}Ca_{0.5}Zr_{1.5}(PO_4)_3$, $Li_{1.3}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$, $Li_{2.9}PO_{3.3}N_{0.46}$, or the like, thio-LISICON type compounds such as $Li_{3.25}Ge_{0.25}P_{0.75}S_4$, $Li_3PS_4$, or the like, and glass compounds such as $Li_2S$—$P_2S_5$, $Li_2O$—$V_2O_5$—$SiO_2$, or the like.

A particle diameter of the solid electrolyte that constitutes the solid electrolyte layer of the all-solid-state battery of the embodiment is desirably 0.05 μm or more and 5 μm or less from a viewpoint that a thin and dense layer is formed.

While the thickness of the solid electrolyte layer is not particularly limited, the thickness is preferably 0.1 μm or more and 100 μm or less, and more preferably 0.3 μm or more and 20 μm or less in a viewpoint of realization of high rate characteristics.

When the thickness of the solid electrolyte layer is 0.1 μm or more and 100 μm or less, a moving distance of a lithium ion during charge and discharge can be reduced and an internal resistance can be decreased while insulation properties of the solid electrolyte layer are maintained.

(Positive Electrode Active Material)

As the positive electrode active material contained in the positive electrode active material layers 52 and 12 and the positive electrode current collector layers 51 and 11 according to the embodiment, for example, lithium oxide, lithium sulfide, or lithium-containing compounds such as interlayer compounds that contains lithium or the like is appropriate, and two or more of them may be used in a mixture. In particular, in order to increase an energy density, lithium complex oxides expressed by a general formula of $Li_xMO_2$ or interlayer compounds that contains lithium are preferable. Further, M is preferably one or more types of transition metals, and specifically, at least one of Co, Ni, Mn, Fe, Al, V and Ti is preferable. x differs according to a charge and discharge state of a battery, and is conventionally a value within a range of $0.05 \le x \le 1.10$. In addition, manganese spinel ($LiMn_2O_4$) having a spinel type crystal structure, lithium iron phosphate ($LiFePO_4$) having an olivine type crystal structure, $LiCoPO_4$, $LiNiPO_4$, or the like, are also preferable because a high energy density can then be obtained.

Specifically, as the positive electrode active material that constitutes the all-solid-state battery 50, the positive electrode active material layers 52 and 12 and the positive electrode current collector layers 51 and 11 of the electricity storage part 10, a material which efficiently discharges and adsorbs lithium ions is preferably used. For example, transition metal oxides or transition metal complex oxides are preferably used. Specifically, any one of lithium manganese complex oxide $Li_2Mn_{x3}Ma_{1-x3}O_3$ ($0.8 \le x3 \le 1$, Ma=Co, Ni), lithium cobalt oxide ($LiCoO_2$), lithium nickel oxide ($LiNiO_2$), lithium manganese spinel ($LiMn_2O_4$), and, complex metal oxides expressed by a general formula:

$LiNi_{x4}Co_{y4}Mn_{z4}O_2$ (x4+y4+z4=1, 0≤x4≤1, 0≤y4≤1, 0≤z4≤1), lithium vanadium compounds ($LiV_2O_5$), olivine type $LiMbPO_4$ (here, Mb is one or more elements selected from Co, Ni, Mn, Fe, Mg, Nb, Ti, Al and Zr), lithium vanadium phosphate ($Li_3V_2(PO_4)_3$ or $LiVOPO_4$), Li excess-based solid solution positive electrode $Li_2MnO_3$—$LiMcO_2$ (Mc=Mn, Co, Ni), lithium titanate ($Li_4Ti_5O_{12}$), and composite metal oxides expressed by $LiaNi_{x5}Co_{y5}Al_{z5}O_2$ (0.9<a<1.3, 0.9<x5+y5+z5<1.1) are preferable. In addition, there is no limitation to these materials, and further, there is no particular limitation as long as the material is a positive electrode active material, into and from which lithium ions may be electrochemically inserted and removed.

A particle diameter of the positive electrode active material that constitutes the positive electrode active material layers 52 and 12 according to the embodiment is preferably 0.05 μm or more and 5 μm or less from a viewpoint that the positive electrode active material layers 52 and 12 are densely and thinly formed.

While the thickness of the positive electrode active material layers 52 and 12 is not particularly limited, the thickness is preferably 0.1 μm or more and 100 μm or less, and more preferably 0.3 μm or more and 10 μm or less from a viewpoint that then an all-solid-state battery having a high capacity and a high output can be obtained.

(Negative Electrode Active Material)

As the negative electrode active material included in the negative electrode active material layers 54 and 14 and the negative electrode current collector layers 53 and 13 according to the embodiment, a material having a low electrical potential with respect to lithium and a large capacity per weight is preferably used from a viewpoint that an all-solid-state battery having a high specific energy density and volume energy density is obtained. For example, the material preferably includes at least one metal selected from the group consisting of Li, Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V and Zn, alloys formed of two or more of these metals, oxides of these metals, phosphorus oxide, oxides of these alloys and phosphorus oxide, or a carbon material.

A particle diameter of the negative electrode active material that constitutes the negative electrode active material layers 54 and 14 according to the embodiment is preferably 0.05 μm or more and 5 μm or less from a viewpoint that then the negative electrode active material layers 54 and 14 are densely and thinly formed.

While the thickness of the negative electrode active material layers 54 and 14 is not particularly limited, the thickness is preferably 0.1 μm or more and 100 μm or less, and preferably 0.5 μm or more and 10 μm or less from a viewpoint that the all-solid-state battery having higher capacity and higher cycle lifetime is obtained.

(First Intermediate Layer or Second Intermediate Layer)

As a material that constitutes the first intermediate layers 56 and 16 or the second intermediate layers 57 and 17 according to the embodiment, a material having electron conductivity, which is bondable to the positive electrode current collector material and the positive electrode active material, and the negative electrode current collector material and the negative electrode active material without being electrochemically decomposed at an operating potential of the positive electrode active material or the negative electrode active material may be used. Specifically, at least one of the first intermediate layers 56 and 16 or the second intermediate layers 57 and 17 is preferably formed of a material including at least one or more elements selected from the group consisting of Li, V, Si, Al, Ge, Sb, Sn, Ga, In, Fe, Co, Ni, Ti, Mn, Ca, Ba, La, Zr, Ce, Cu, Mg, Sr, Cr, Mo, Nb, Zn and P, or an amorphous material thereof. For example, any one of lithium vanadium phosphate ($Li_3V_2(PO_4)_3$ or $LiVOPO_4$), olivine type $LiMbPO_4$ (here, Mb is one or more elements selected from Co, Ni, Mn, Fe, Mg, Nb, Ti, Al, Zr), lithium cobalt oxide ($LiCoO_2$), lithium manganese complex oxides $Li_2Mn_{x3}Ma_{1-x3}O_3$ (0.8≤x3≤1, Ma=Co, Ni), lithium nickelate ($LiNiO_2$), lithium manganese spinel ($LiMn_2O_4$), and a composite metal oxide expressed by a general formula: $LiNi_{x4}Co_{y4}Mn_{z4}O_2$ (x4+y4+z4=1, 0≤x4≤1, 0≤y4≤1, 0≤z4≤1), lithium vanadium compounds ($LiV_2O_5$), Li surplus-based solid solution $Li_2MnO_3$—$LiMcO_2$ (Mc=Mn, Co, Ni), lithium titanate ($Li_4Ti_5O_{12}$), and composite metal oxides expressed by $LiaNi_{x5}Co_{y5}Al_{z5}O_2$ (0.9<a<1.3, 0.9<x5+y5+z5<1.1), perovskite type compounds such as $La_{0.5}Li_{0.5}TiO_3$ or the like, LISICON type compounds such as $Li_{14}Zn(GeO_4)_4$ or the like, garnet type compounds such as $Li_7La_3Zr_2O_{12}$ or the like, phosphate compounds such as $LiTi_2(PO_4)_3$, $LiGe_2(PO_4)_3$, $LiZr_2(PO_4)_3$ (monocline), $LiZr_2(PO_4)_3$ (rhombohedron), $Li_{1.5}Ca_{0.5}Zr_{1.5}(PO_4)_3$, $Li_{1.5}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$, $Li_{2.9}PO_{3.3}N_{0.46}$, or the like, thio-LISICON type compounds such as $Li_{3.25}Ge_{0.25}P_{0.75}S_4$, $Li_3PS_4$, or the like, glass compounds such as $Li_2S$—$P_2S_5$, $Li_2O$—$V_2O_5$—$SiO_2$, or the like, or amorphous materials thereof, conductive glasses (transition element-based glasses containing an element such as iron, molybdenum, vanadium, tungsten, titanium, or the like), or the like are exemplary examples. In addition, the material is not limited to these materials, and further, is not particularly limited as long as the material is a material that is bondable to the positive electrode current collector material and the positive electrode active material having electron conductivity.

A particle diameter of the material that constitutes the first intermediate layers 56 and 16 or the second intermediate layers 57 and 17 of the all-solid-state battery of the embodiment is desirably 0.05 μm or more and 5 μm or less from a viewpoint that a dense layer is formed.

A thickness of the first intermediate layers 56 and 16 or the second intermediate layers 57 and 17 of the all-solid-state battery of the embodiment is preferably 0.1 μm or more and 1000 μm or less, and more preferably 0.1 μm or more and 500 μm or less from a viewpoint that the all-solid-state battery having high efficiency is obtained while the bonding between the positive electrode current collector layers 51 and 11 and the positive electrode active material layers 52 and 12 or between the negative electrode current collector layers 53 and 13 and the negative electrode active material layers 54 and 14 is appropriately performed.

In addition, the thickness of the first intermediate layers 56 and 16 or the second intermediate layers 57 and 17 is more preferably 0.1 μm or more and 10 μm or less.

According to this configuration, since the thickness of the first intermediate layers 56 and 16 or the second intermediate layers 57 and 17 is 0.1 μm or more and 10 μm or less, an increase in resistance can be minimized by providing the first intermediate layers 56 and 16 obtained by appropriately bonding the positive electrode current collector layers 51 and 11 and the positive electrode active material layers 52 and 12 or the second intermediate layers 57 and 17 obtained by appropriately bonding the negative electrode current collector layers 53 and 13 and the negative electrode active material layers 54 and 14, and a more uniform electrochemical reaction becomes possible. Accordingly, cycling characteristics can be further improved.

(Conductive Assistant)

In the positive electrode active material layers 52 and 12, the negative electrode active material layers 54 and 14, the first intermediate layers 56 and 16, or the second intermediate layers 57 and 17 according to the embodiment, in order to improve conductivity, conductive assistants may be added. The conductive assistants used in the embodiment are not particularly limited and known materials may be used. The conductive assistants added to the positive electrode active material layers 52 and 12, the negative electrode active material layers 54 and 14, the first intermediate layers 56 and 16, or the second intermediate layers 57 and 17 may be the same as each other or may be different from each other.

The conductive assistants preferably have high conductivity. For this reason, for example, silver, palladium, silver-palladium alloy, gold, platinum, aluminum, copper, nickel, carbon, or the like, is preferably used in the positive electrode active material layers 52 and 12, the negative electrode active material layers 54 and 14, the first intermediate layers 56 and 16, or the second intermediate layers 57 and 17.

A particle diameter of the conductive assistants is desirably 0.02 µm or more and 2 µm or less from a viewpoint that electrical connection between the positive electrode active material, the first intermediate layers 56 and 16 and the positive electrode current collector layers 52 and 12, or between the negative electrode active material, the second intermediate layers 57 and 17 and the negative electrode current collector layers 54 and 14 is improved, and charge and discharge with high output becomes possible.

In addition, a ratio of the added conductive assistants is not particularly limited as long as the positive electrode active material or the negative electrode active material included in the positive electrode active material layers 52 and 12 or the negative electrode active material layers 54 and 14 electrochemically functions. For example, in order to obtain the all-solid-state battery having higher capacity and higher output while self-discharge characteristics are increased, a ratio of the positive electrode active material/the conductive assistants or the negative electrode active material/the conductive assistants is a volume ratio that is preferably within a range of 100/0 to 60/40 from a viewpoint that electrical resistance is decreased.

(Lithium Ion Conductive Assistant)

In the positive electrode active material layers 52 and 12, the negative electrode active material layers 54 and 14, the first intermediate layers 56 and 16, or the second intermediate layers 57 and 17 according to the embodiment, in order to improve lithium ion conductivity, lithium ion conductive assistants may be added. The lithium ion conductive assistants used in the embodiment are not particularly limited and known materials may be used. The lithium ion conductive assistants added to the positive electrode active material layers 52 and 12, the negative electrode active material layers 54 and 14, the first intermediate layers 56 and 16, or the second intermediate layers 57 and 17 may be the same as each other or may be different from each other.

The lithium ion conductive assistants preferably use a material having high lithium ion conductivity. For example, the lithium ion conductive assistants are desirably at least one selected from the group consisting of perovskite type compound such as $La_{0.5}Li_{0.5}TiO_3$ or the like, silicon type compound such as $Li_{14}Zn(GeO_4)_4$ or the like, garnet type compound such as $Li_7La_3Zr_2O_{12}$ or the like, phosphate compound such as $LiTi_2(PO_4)_3$, $LiGe_2(PO_4)_3$, $LiZr_2(PO_4)_3$ (monocline), $LiZr_2(PO_4)_3$ (rhombohedron), $Li_{1.5}Ca_{0.5}Zr_{1.5}(PO_4)_3$, $Li_{1.3}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$, $Li_{2.9}PO_{3.3}N_{0.46}$, lithium phosphate, or the like, thio silicon type compound such as $Li_{3.25}Ge_{0.25}P_{0.75}S_4$, $Li_3PS_4$, or the like, oxide such as LiPON, lithium niobate, lithium silicate, lithium borate, or the like, or glass compound such as $Li_2S-P_2S_5$, $Li_2O-V_2O_5-SiO_2$, or the like.

A particle diameter of the lithium ion conductive assistants is desirably 0.02 µm or more and 2 µm or less from a viewpoint that movement of lithium ions between the positive electrode active material and the solid electrolyte layers 55 and 15 or between the negative electrode active material and the solid electrolyte layers 55 and 15 is appropriately performed.

In addition, a proportion of the added lithium ion conductive assistants is not particularly limited as long as the positive electrode active material or the negative electrode active material included in the positive electrode active material layers 52 and 12 or the negative electrode active material layers 54 and 14 electrochemically functions. For example, in order to obtain the all-solid-state battery having higher capacity and higher output while increasing self-discharge characteristics, a proportion of the positive electrode active material/the lithium ion conductive assistants or the negative electrode active material/the lithium ion conductive assistants is preferably within a range of 100/0 to 60/40 at a volume ratio from a viewpoint that internal resistance is reduced.

(Current Collector Material)

As a specific example of the current collector material that constitutes the positive electrode current collector layers 51 and 11 and the negative electrode current collector layers 53 and 13, gold (Au), platinum (Pt), platinum (Pt)-palladium (Pd), silver (Ag), silver (Ag)-palladium (Pd), aluminum (Al), copper (Cu), nickel (Ni), indium tin oxide film (ITO), or the like, is preferable.

In addition, each of the positive electrode current collector layers 51 and 11 and the negative electrode current collector layers 53 and 13 may include the positive electrode active material and the negative electrode active material. A fraction of the active material included in each of the current collectors is not particularly limited as long as the active material functions as a current collector. For example, the positive electrode current collector material/the positive electrode active material or the negative electrode current collector material/the negative electrode active material at a volume ratio is preferably within a range of 95/5 to 70/30.

Since the positive electrode current collector layers 51 and 11 and the negative electrode current collector layers 53 and 13 include the positive electrode active material and the negative electrode active material, it is preferable in that adhesion between the positive electrode current collector layers 51 and 11 and the positive electrode active material layers 52 and 12, and between the negative electrode current collector layers 53 and 13 and the negative electrode active material layers 54 and 14 is improved and cracks are minimized.

(Sintering Additives)

While types of sintering additives added to the positive electrode current collector layers 51 and 11, the positive electrode active material layers 52 and 12, the negative electrode current collector layers 53 and 13, the negative electrode active material layers 54 and 14, the solid electrolyte layers 55 and 15, the first intermediate layers 56 and 16, and the second intermediate layers 57 and 17 that constitute the all-solid-state battery 50 are not particularly limited as long as sintering of the constituent materials can be performed at a low temperature, lithium compound such as lithium carbonate, lithium hydroxide, phosphate lithium, or the like, boron compound such as $H_3BO_3$ or the like, or compound composed of lithium and boron may be used. These materials can be weighed in the air because the compound form is difficult to change due to water or carbon dioxide, and it is preferable because lithium and boron can be added easily and accurately.

(Terminal Electrode)

A material having high conductivity is preferably used in the terminal electrodes 58 of the all-solid-state battery 50. For example, silver, gold, platinum, aluminum, copper, tin, and nickel can be used. The terminal electrodes may be provided as a single layer or a plurality of layers.

(Method of Manufacturing all-Solid-State Battery)

A method of manufacturing the all-solid-state battery 50 may be a simultaneous baking method or may be a sequential baking method. The simultaneous baking method is a method of stacking materials that form layers, and fabricating laminates through collective baking. The sequential baking method is a method of fabricating layers in sequence, and a baking process enters every time each layer is fabricated. A work process of the all-solid-state battery 50 can be reduced by using the simultaneous baking method. Hereinafter, the method of manufacturing the all-solid-state battery 50 will be described with reference to an example when the simultaneous baking method is used.

Materials of the positive electrode current collector layer 51, the positive electrode active material layer 52, the solid electrolyte layer 55, and, the negative electrode current collector layer 53, the negative electrode active material layer 54, the first intermediate layer 56, and the second intermediate layer 57 that constitute the all-solid-state battery 50 of the embodiment are pasted.

A pasting method is not particularly limited. For example, a paste is obtained by mixing powder of each material with a vehicle. Here, the vehicle is a generic term for media in a liquid phase. The vehicle generally includes solvents, dispersing agents, and binders. According to this method, a paste for an exterior part, a paste for a positive electrode current collector layer, a paste for a positive electrode active material layer, a paste for a solid electrolyte layer, a paste for a negative electrode current collector layer, a paste for a negative electrode active material layer, a paste for a first intermediate layer, and a paste for a second intermediate layer are fabricated.

While a composition of the paste for a positive electrode current collector layer and the paste for a negative electrode current collector layer is not particularly limited, for example, in addition to the current collector material, a positive electrode active material, a negative electrode active material, a solid electrolyte or sintering additives may be included.

While a composition of the paste for a positive electrode active material layer and the paste for a negative electrode active material layer is not particularly limited, for example, in addition to the positive electrode active material or the negative electrode active material, a solid electrolyte, sintering additives, conductive assistants or lithium ion conductive assistants may be included.

While a composition of the paste for a solid electrolyte layer is not particularly limited, for example, in addition to the solid electrolyte, sintering additives may be included.

While a composition of the paste for a first intermediate layer is not particularly limited, for example, in addition to the first intermediate layer material, sintering additives, conductive assistants or lithium ion conductive assistants may be included.

While a composition of the paste for a second intermediate layer is not particularly limited, for example, in addition to the second intermediate layer material, sintering additives, conductive assistants or lithium ion conductive assistants may be included.

A green sheet for a solid electrolyte layer is obtained by painting the fabricated paste for a solid electrolyte layer on a base material such as polyethylene terephthalate (PET) or the like in a desired sequence and drying them according to necessity. A method of painting a paste is not particularly limited, and a known method such as screen printing, painting, transfer, a doctor blade, or the like, may be employed.

A positive electrode layer green sheet is fabricated by screen-printing a paste for a positive electrode active material layer, a paste for a first intermediate layer and a paste for a positive electrode current collector layer on the fabricated green sheet for a solid electrolyte layer or a green sheet for an exterior part in a predetermined sequence, and forming a positive electrode active material layer, a first intermediate layer and a positive electrode current collector layer. Further, in some cases, a screen having a non-printed pattern may be changed to the printed positive electrode active material layer, first intermediate layer and positive electrode current collector layer, and a paste for a solid electrolyte layer may be printed onto a non-printed part on the positive electrode layer green sheet.

Like the negative electrode, a negative electrode layer green sheet is fabricated by screen-printing a paste for a negative electrode active material layer and a paste for a second intermediate layer and a paste for a negative electrode current collector layer on the fabricated green sheet for a solid electrolyte layer or the fabricated green sheet for an exterior part in a predetermined sequence, and forming a negative electrode active material layer, a second intermediate layer and a negative electrode current collector layer. Further, in some cases, a screen having a non-printed pattern may be changed to the printed negative electrode active material layer, second intermediate layer and negative electrode current collector layer, and a paste for a solid electrolyte layer may be printed on a non-printed part on the negative electrode layer green sheet.

After the green sheet for a solid electrolyte layer is stacked to a desired number, the fabricated positive electrode layer green sheet, negative electrode layer green sheet are staggered and stacked such that the positive electrode current collector layer of the positive electrode layer green sheet extends to only one end surface and the negative electrode current collector layer of the negative electrode layer green sheet extends from only the other surface in a desired sequence, and then, the green sheet for a solid electrolyte layer is stacked to a desired number one more time, thereby obtaining a temporary laminate.

When a parallel type or a serial type battery is fabricated, in order to accurately stack the positive electrode active material layer and the negative electrode active material layer such that the end surfaces thereof do not coincide with each other, the layers are preferably aligned and stacked. In addition, a stacking structure is not particularly thereto.

The fabricated temporary laminates are collectively pressurized to fabricate the laminates. While the pressurization is performed together with heating, a heating temperature is for example 40 to 90° C.

The obtained laminates are aligned according to necessity and cut, and thus, the laminates individualized at desired dimensions are fabricated. The cutting method is not particularly limited, and may be performed by dicing, knife cutting, or the like.

Before the individualized laminates are baked, chamfering may be performed by a dry green barrel or a wet green barrel.

Upon the dry green barrel, the dry green barrel may be performed together with abrasives such as alumina, zirconia, resin beads, or the like.

Upon the wet green barrel, in addition to the abrasives such as alumina, zirconia, resin beads, or the like, a solvent is used. In the solvent at this time, for example, ion exchanged water, pure water, fluorine solvent, or the like, can be used.

The individualized laminates are heated and baked under, for example, a nitrogen atmosphere, to obtain a sintered body. In manufacture of the all-solid-state battery 50 of the embodiment, the baking temperature is preferably within a range of 600 to 1200° C. When the temperature is less than 600° C., the baking is insufficient, and when the temperature exceeds 1200° C., problems such as dissolution of the current collector material, variation in a structure of the positive electrode active material or the negative electrode active material, or the like, may occur. Further, the temperature is more preferably within a range of 700 to 1000° C. When the temperature is within the range of 700 to 1000° C., it is more appropriate for promotion of baking and reduction in manufacturing costs. A baking time is, for example, 10 minutes to three hours.

The obtained sintered body may enter a cylindrical container together with a polishing agent such as alumina, resin beads, or the like, and may be barrel-polished. Accordingly, chamfering of corners of the sintered body can be performed. Alternatively, sandblast may be used for polishing. This method is preferable because only a specific portion can be cut.

When the terminal electrodes 58 are not formed before baking, the terminal electrodes 58 can be formed by using a known method such as a sputtering method, a dipping method, a spray coating method, or the like, on the obtained sintered body. When the terminal electrodes 58 are formed only on predetermined portions, they are formed through, for example, masking or the like with a tape.

While the method of forming the terminal electrodes 58 is not limited, as a specific example of the material that can be used for the terminal electrode, gold (Au), platinum (Pt), platinum (Pt)-palladium (Pd), silver (Ag), silver (Ag)-palladium (Pd), aluminum (Al), copper (Cu), indium, indium tin oxide film (ITO), and the like, are exemplary examples.

In addition, the forming method may form a terminal electrode using a thermosetting conductive paste obtained by mixing and pasting particles of the conductive material with the thermosetting resin.

A plating film may be applied to the terminal electrodes 58. While the plating method and the type of the film are not particularly limited, and for example, a Ni—Sn film may be formed by forming a Ni film through electroless Ni plating or electrolyte Ni plating, and then, forming a Sn film through tin electroplating.

In addition, a film may be formed on the terminal electrode by a sputter using at least one metal of Pt, Au, Cu, Ti, Ni, Sn, and the like, and an alloy thereof.

Water repellent treatment may be performed on a surface of the all-solid-state battery 50 of the embodiment. While a method of the water repellent treatment is not particularly limited, for example, the terminal electrode is formed by being dipped in a solution formed of a flurocarbon resin, a silane resin, or the like.

A glass layer may be formed on a surface of the all-solid-state battery 50 of the embodiment. While the forming method is not particularly limited, the glass layer may be formed by painting low melting point glass and performing heat treatment at a desired temperature.

The all-solid-state battery 50 of the embodiment may be accommodated in a case having high sealability. A shape of the accommodating case is a square type, a column type, a coin type, a card type, or the like, and not limited thereto.

The all-solid-state battery 50 of the embodiment may be coated with a resin. A fluorine resin is preferably used from a viewpoint of improvement in thermal resistance and moisture resistance of the film.

In the all-solid-state battery 50 of the embodiment, a lead may be provided on the terminal electrode. The terminal electrode may be coated with a resin after the lead is attached thereto. It is preferable from a viewpoint of improvement in electrical bondability to an external circuit.

In the all-solid-state battery 50 of the embodiment, the terminal electrode may be coated with the resin after the lead is provided. It is preferable from a viewpoint of improvement in cycling characteristics due to improvement in electrical bondability to an external circuit and improvement in moisture resistance.

The all-solid-state battery 50 of the embodiment may be used in combination with another lithium ion secondary battery, a photovoltaic generation unit, a wind power generation unit, a geothermal power generation unit, a piezoelectric element, a thermoelectric element, or the like.

Hereinabove, while the embodiment of the present invention has been described in detail with reference to the accompanying drawings, the components of the embodiment and combinations thereof are merely exemplary examples, and additions, omissions, substitutions and other modifications of the components may be made without departing from the spirit of the present invention.

EXAMPLES

While the present invention will be described below using examples, the present invention is not limited to the examples. Further, expression of parts is parts by weight unless the context clearly indicates otherwise.

Example 1

Fabrication of Positive Electrode Active Material and Negative Electrode Active Material As the positive electrode active material and the negative electrode active material, $Li_3V_2(PO_4)_3$ fabricated by the following method was used. $Li_2CO_3$, $V_2O_5$ and $NH_4H_2PO_4$ are used as starting materials, and these are weighted to become a mole ratio of 3:2:6, wet-blended for 16 hours by a ball mill using water as a solvent, and then, hydrated and dried. The obtained powder was calcined at a temperature of 850° C. for two hours in a nitrogen-hydrogen mixed gas. The calcined product was roughly crushed, wet-ground for 24 hours by a ball mill using ethanol as a solvent, and then, dried to obtain the positive electrode active material powder and negative electrode active material powder. The average particle diameter of the powder was 0.3 μm. It was confirmed using an X-ray diffraction device that the fabricated powder was $Li_3V_2(PO_4)_3$.

(Fabrication of Positive Electrode Active Material Paste and Negative Electrode Active Material Paste)

In the positive electrode active material paste and the negative electrode active material paste, ethyl cellulose of 15 parts as a binder and dihydroterpineol of 65 parts as a solvent were added to the fabricated $Li_3V_2(PO_4)_3$ as active material powder of 100 parts, and kneaded and dispersed by a hybrid mixer to fabricate the positive electrode active material paste and the negative electrode active material paste.

(Fabrication of Solid Electrolyte)

As the solid electrolyte, $LiZr_2(PO_4)_3$ rhombohedron fabricated by the following method was used. First, each of $LiOH \cdot H_2O$, $ZrO(NO_3)_2$ and $NH_4(H_2PO_4)$ was weighed at a stoichiometric ratio, and dissolved in water. The solutions were mixed, heated to 80° C. after adjusting pH thereof, and then, annealed. It was confirmed using X-ray diffraction that the fabricated powder is $LiZr_2(PO_4)_3$ rhombohedron. The particle diameter (D50) was 0.5 μm.

(Fabrication of Solid Electrolyte Layer Sheet)

In the solid electrolyte layer sheet, ethanol of 100 parts and toluene of 200 parts as a solvent were added and wet-blended with the fabricated $LiZr_2(PO_4)_3$ rhombohedron powder of 100 parts by a ball mill. After that, a polyvinyl butyral-based binder of 16 parts and benzyl butyl phthalate of 4.8 parts were further input and mixed to prepare solid electrolyte slurry. The solid electrolyte slurry was formed in a sheet shape through a doctor blade method using a PET film as a base material, and a solid electrolyte layer sheet having a thickness of 15 μm was obtained.

(Fabrication of Solid Electrolyte Paste)

In the solid electrolyte paste, ethyl cellulose of 15 parts as a binder and dihydroterpineol of 65 parts as a solvent were added to the fabricated $LiZr_2(PO_4)_3$ as rhombohedron powder of 100 parts, and kneaded and dispersed by a hybrid mixer to fabricate a positive electrode active material paste.

(Fabrication of First Intermediate Layer Material and Second Intermediate Layer Material)

As the first intermediate layer material and the second intermediate layer material, amorphous $Li_3V_2(PO_4)_3$ fabricated by the following method was used. $Li_2CO_3$, $V_2O_5$ and $NH_4H_2PO_4$ used as starting materials are weighted to become a mole ratio of 3:2:6, wet-blended for 16 hours by a ball mill using water as a solvent, and then, hydrated and dried. The obtained powder was calcined at a temperature of 850° C. for two hours in a nitrogen-hydrogen mixed gas. The calcined product is roughly crushed, wet-ground for 24 hours by a ball mill using ethanol as a solvent, and then, dried to obtain a positive electrode active material powder. The average particle diameter of the powder was 0.3 μm. It was confirmed using an X-ray diffraction device that the fabrication powder is $Li_3V_2(PO_4)_3$.

After that, the obtained $Li_3V_2(PO_4)_3$ powder was placed in an alumina crucible and calcined at a temperature of 700° C. for one hour in the air. The calcined product is roughly crushed, wet-ground for 24 hours by a ball mill using ethanol as a solvent, and then, passed through a mesh path and dried by an explosion-proof dryer, the dried powder is cracked and passed through the mesh path, and the first intermediate layer material and the second intermediate layer material were obtained. The average particle diameter of the powder was 0.1 μm. It was confirmed by an X-ray diffraction device that a peak of the original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by an ICP emission spectral analysis method.

(Fabrication of First Intermediate Layer Paste and Second Intermediate Layer Paste)

In the first intermediate layer paste and the second intermediate layer paste, ethyl cellulose of 10 parts as a binder and dihydroterpineol of 60 parts as a solvent were added to the fabricated amorphous $Li_3V_2(PO_4)_3$ of 100 parts, and kneaded and dispersed by a hybrid mixer to fabricate the first intermediate layer paste and the second intermediate layer paste.

(Fabrication of Positive Electrode Current Collector Paste and Negative Electrode Current Collector Paste)

After copper powder and $Li_3V_2(PO_4)_3$ powder were mixed at a volume ratio of a proportion of 80/20 as the positive electrode current collector paste and the negative electrode current collector paste, ethyl cellulose of 10 parts as a binder and dihydroterpineol of 50 parts as a solvent are added, and kneaded and dispersed to fabricate the positive electrode current collector paste and the negative electrode current collector paste using three rolls.

The all-solid-state battery was fabricated using these pastes as follows.

(Fabrication of Positive Electrode Active Material Unit)

The positive electrode active material paste, the first intermediate layer paste, the positive electrode current collector paste, the first intermediate layer paste, and the positive electrode active material paste were sequentially printed on the solid electrolyte layer sheet through screen printing. After the pastes were printed, printing of the next paste was performed after drying at 80 to 100° C. for 5 to 10 minutes.

Next, the screen was changed, and the solid electrolyte paste was printed on a portion in which the positive electrode active material paste, the first intermediate layer paste and the positive electrode current collector paste are not printed, and dried at 80 to 100° C. for 5 to 10 minutes. A PET film was peeled off after all printing was finished. As a result, the positive electrode active material unit in which the positive electrode active material paste, the first intermediate layer paste, the positive electrode current collector paste, the first intermediate layer paste, the positive electrode active material paste, and the solid electrolyte paste were printed and dried on the solid electrolyte layer sheet was obtained.

(Fabrication of Negative Electrode Active Material Unit)

The negative electrode active material paste, the second intermediate layer paste, the negative electrode current collector paste, the second intermediate layer paste, and the negative electrode active material paste were sequentially printed on the solid electrolyte layer sheet through screen printing. After the pastes were printed, printing of the next paste was printed after drying at 80 to 100° C. for 5 to 10 minutes.

Next, the screen was changed, and the solid electrolyte paste was printed on a portion in which the negative electrode active material paste, the second intermediate layer paste and the negative electrode current collector paste were not printed, and dried at 80 to 100° C. for 5 to 10 minutes. The PET film was peeled off after the entire printing is terminated. As a result, the negative electrode active material unit in which the negative electrode active material paste, the second intermediate layer paste, the negative electrode current collector paste, the first intermediate layer paste paste, the negative electrode active material paste, and the solid electrolyte paste were printed and dried on the solid electrolyte layer sheet was obtained.

(Fabrication of Laminate)

Ten solid electrolyte sheets were accumulated, 13 sheets of positive electrode active material units and 13 sheets of negative electrode active material units were accumulated in sequence of the positive electrode active material unit and the negative electrode active material unit while paste printing surfaces are directed downward, and stacked. Here, the units were shifted and accumulated such that the positive electrode current collector paste layer of the positive electrode active material unit extends from only one end surface and the negative electrode current collector paste layer of the negative electrode active material unit extends from the other surface. Then, ten solid electrolyte sheets were accumulated. After that, this is formed at a temperature of 80° C. and pressure of 1000 kgf/cm$^2$ (98 MPa), and cut to fabricate laminated blocks. After that, the laminated blocks were simultaneously baked to obtain sintered bodies. The simultaneous baking increases a temperature to a baking temperature of 900° C. at a temperature increase rate of 200° C./hour in nitrogen, and holds the temperature for 0.5 hours, and naturally cools the laminated blocks after the baking. The exterior size of the battery after the simultaneous baking was 3.2 mm×2.5 mm×1.0 mm.

(Form of Terminal Electrode)

Then, the all-solid-state battery was fabricated by painting an InGa electrode paste on the positive electrode current collector layer and the negative electrode current collector layer of the obtained sintered body, drying the InGa electrode paste, and attaching the terminal electrode to the positive electrode current collector layer and the negative electrode current collector layer.

(Estimation)

Chemical compositions and crystalline structures of the fabricated positive electrode active material, the negative electrode active material, the solid electrolyte, the first intermediate layer material, and the second intermediate layer material were measured according to the following method.

(Chemical Compositions)

Compositions of the positive electrode active material, the negative electrode active material, the solid electrolyte, the first intermediate layer material, and the second intermediate layer material were analyzed by ICP-AES.

(Crystalline Structures)

Crystalline structures of the positive electrode active material, the negative electrode active material, the solid electrolyte, the first intermediate layer material, and the second intermediate layer material were measured and identified by a powder X-ray diffraction method.

(Observation of Cross Section)

The fabricated all-solid-state battery was carefully dry-polished to the most central section with an abrasive paper, polished debris was removed by air blow, and then, ion milling was performed on the polished surface with Ar gas.

After that, observation in the vicinity of the positive electrode current collector and the vicinity of the negative electrode current collector of the all-solid-state battery was performed by an electron microscope. Here, the observation was performed such that the positive electrode current collector layer, the first intermediate layer and the positive electrode active material layer, and the negative electrode current collector layer, the second intermediate layer and the negative electrode active material layer enter a field of vision.

The bonding rate in this example is obtained by, first, measuring a length of the positive electrode current collector layer and a length of the first intermediate layer in the field of vision that was observed by the electron microscope. The bonding rate is a value obtained by dividing the measured length of the first intermediate layer by the measured length of the positive electrode current collector layer. Alternatively, the length of the negative electrode current collector layer and the length of the second intermediate layer are measured. The bonding rate is a value obtained by dividing the measured length of the second intermediate layer by the measured length of the negative electrode current collector layer.

The bonding rate of the first intermediate layer and the bonding rate of the second intermediate layer are shown in Table 1 to Table 2.

Example 2

An all-solid-state battery was fabricated in the same manner as Example 1 except that the second intermediate layer was not provided.

Example 3

An all-solid-state battery was fabricated in the same manner as Example 1 except that the first intermediate layer was not provided.

Example 4

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 10 parts as a binder and dihydroterpineol of 50 parts as a solvent to the fabricated amorphous $Li_3V_2(PO_4)_3$ of 100 parts and kneading and dispersing them using a hybrid mixer.

Example 5

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 15 parts as a binder and dihydroterpineol of 60 parts as a solvent to the fabricated amorphous $Li_3V_2(PO_4)_3$ of 100 parts and kneading and dispersing them using a hybrid mixer.

Example 6

An all-solid-state battery was fabricated in the same manner as Example 1 except that the first intermediate layer paste and the second intermediate layer paste were used as the first intermediate layer paste and the second intermediate layer paste fabricated by adding ethyl cellulose 15 parts as a binder and dihydroterpineol 75 parts as a solvent to the fabricated amorphous $Li_3V_2(PO_4)_3$ 100 parts and kneading and dispersing them using a hybrid mixer.

Example 7

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 20 parts as a binder and dihydroterpineol of 100 parts as a solvent to the fabricated amorphous $Li_3V_2(PO_4)_3$ of 100 parts and kneading and dispersing them using a hybrid mixer.

Example 8

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 25 parts as a binder and dihydroterpineol of 150 parts as a solvent to the fabricated amorphous $Li_3V_2(PO_4)_3$ of 100 parts and kneading and dispersing them using a hybrid mixer.

Example 9

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 30 parts as a binder and dihydroterpineol of 200 parts as a solvent to the fabricated amorphous $Li_3V_2(PO_4)_3$ of 100 parts and kneading and dispersing them using a hybrid mixer.

Example 10

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 50 parts as a binder and dihydroterpineol of 300 parts as a solvent to the fabricated amorphous $Li_3V_2(PO_4)_3$ of 100 parts and kneading and dispersing them using a hybrid mixer.

Example 11

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 70 parts as a binder and dihydroterpineol of 500 parts as a solvent to the fabricated amorphous $Li_3V_2(PO_4)_3$ of 100 parts and kneading and dispersing them using a hybrid mixer.

Example 12

An all-solid-state battery was fabricated in the same manner as Example 1 except that the first intermediate layer paste and the second intermediate layer paste were used as the first intermediate layer paste and the second intermediate layer paste fabricated by adding ethyl cellulose of 90 parts as a binder and dihydroterpineol of 700 parts as a solvent to the fabricated amorphous $Li_3V_2(PO_4)_3$ of 100 parts and kneading and dispersing them using a hybrid mixer.

Example 13

An all-solid-state battery was fabricated in the same manner as Example 1 except that the $Li_4Ti_5O_{12}$ fabricated by the following method was used as the negative electrode active material.

$Li_2CO_3$ and $TiO_2$ were used as starting materials, weighed to become a mole ratio of 2:5, wet-blended for 16 hours by a ball mill using water as a solvent, and then, hydrated and dried. The obtained powder was calcined at 950° C. for four hours in an atmospheric gas. The calcined product was roughly crushed, wet-ground for 16 hours by a ball mill using ethanol as a solvent, and then, hydrated and dried to obtain the negative electrode active material powder. The average particle diameter of the powder was 0.4 It was confirmed using an X-ray diffraction device that the fabricated powder was $Li_4Ti_5O_{12}$.

Example 14

An all-solid-state battery was fabricated in the same manner as Example 13 except that the second intermediate layer is not provided.

Example 15

An all-solid-state battery was fabricated in the same manner as Example 13 except that the first intermediate layer is not provided.

Example 16

An all-solid-state battery was fabricated in the same manner as Example 1 except that lithium cobalt oxide manufactured by Sigma Aldrich Corporation was used as the positive electrode active material.

Example 17

An all-solid-state battery was fabricated in the same manner as Example 16 except that the second intermediate layer is not provided.

Example 18

An all-solid-state battery was fabricated in the same manner as Example 16 except that the first intermediate layer is not provided.

Example 19

An all-solid-state battery was fabricated in the same manner as Example 1 except that $LiCoPO_4$ fabricated by the following method was used as the positive electrode active material.

$Li_2CO_3$, $CoO_2$ and $NH_4H_2PO_4$ was used as starting material, and these are weighed according to a chemical stoichiometric ratio, wet-blended for 16 hours by a ball mill using ethanol as a solvent, and then, hydrated and dried. The obtained powder was calcined at 700° C. for four hours in an atmospheric gas. The calcined product was roughly crushed, wet-ground for 16 hours by a ball mill using ethanol as a solvent, and then, hydrated and dried to obtain the positive electrode active material powder. The average particle diameter of the powder was 0.5 µm. It was confirmed using an X-ray diffraction device that the fabricated powder was $LiCoPO_4$.

Example 20

An all-solid-state battery was fabricated in the same manner as Example 19 except that the second intermediate layer is not provided.

Example 21

An all-solid-state battery was fabricated in the same manner as Example 19 except that the first intermediate layer is not provided.

Example 22

Fabrication of First Intermediate Layer Material and Second Intermediate Layer Material The amorphous $Li_3V_2(PO_4)_3$ fabricated through the following method was used as the first intermediate layer material and the second intermediate layer material. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 µm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hours in an air gas. The calcined product was roughly crushed, wet-ground for 24 hours by a planet ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 0.03 µm. It was confirmed by an X-ray diffraction device that a peak of the original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by an ICP emission spectral analysis method. An all-solid-state battery was fabricated in the same manner as Example 1 except that the first intermediate layer material and the second intermediate layer material, which were fabricated in this way, were used.

Examples 23, 24, 33, 37 and 41

Fabrication of First Intermediate Layer Material and Second Intermediate Layer Material As the first intermediate layer material and the second intermediate layer material, the amorphous $Li_3V_2(PO_4)_3$ fabricated in the following method was used. $Li_2CO_3$, $V_2O_5$ and $NH_4H_2PO_4$ were used as starting material, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 µm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 16 hours by a planet ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 0.05 It was confirmed by an X-ray diffraction device that a peak of an original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by an ICP emission spectral analysis method. An all-solid-state battery was fabricated in the same manner as Example 1, Example 3, Example 13, Example 16 and Example 19 except that the first intermediate layer material and the second intermediate layer material, which were fabricated in this way, were used.

Examples 25, 26, 34, 38 and 42

Fabrication of First Intermediate Layer Material and Second Intermediate Layer Material As the first intermediate layer material and the second intermediate layer material, the amorphous $Li_3V_2(PO_4)_3$ fabricated through the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 µm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 18 hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 0.3 µm. It was confirmed by an X-ray diffraction device that a peak of original $Li_3V_2(PO_4)_3$ was disappeared from the fabricated powder, no clear diffraction phenomenon was not confirmed, and the powder was amorphous $Li_3V_2(PO_4)_3$ powder. In addition, the composition was confirmed by ICP emission spectral analysis. An all-solid-state battery was fabricated in the same manner as Example 1, Example 2, Example 13, Example 16 and Example 19 except that the first intermediate layer material and the second intermediate layer material, which were fabricated in this way, were used.

Examples 27 and 28

Fabrication of First Intermediate Layer Material and Second Intermediate Layer Material As the first intermediate layer material and the second intermediate layer material, the amorphous $Li_3V_2(PO_4)_3$ fabricated through the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 μm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 16 hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 0.5 μm. It was confirmed by an X-ray diffraction device that a peak of original $Li_3V_2(PO_4)_3$ was disappeared from the fabricated powder, no clear diffraction phenomenon was not confirmed, and the powder was amorphous $Li_3V_2(PO_4)_3$ powder. In addition, the composition was confirmed by ICP emission spectral analysis. An all-solid-state battery was fabricated in the same manner as Example 1 and Example 3 except that the first intermediate layer material and the second intermediate layer material, which were fabricated in this way, were used.

Examples 29, 35, 39 and 43

Fabrication of First Intermediate Layer Material and Second Intermediate Layer Material As the first intermediate layer material and the second intermediate layer material, the amorphous $Li_3V_2(PO_4)_3$ fabricated in the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 μm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 12 hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 1 μm. It was confirmed by an X-ray diffraction device that a peak of original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by ICP emission spectral analysis. An all-solid-state battery was fabricated in the same manner as Example 1, Example 13, Example 16 and Example 19 except that the first intermediate layer material and the second intermediate layer material, which were fabricated in this way, were used.

Example 30

Fabrication of First Intermediate Layer Material and Second Intermediate Layer Material As the first intermediate layer material and the second intermediate layer material, the amorphous $Li_3V_2(PO_4)_3$ fabricated in the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and the, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 μm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 8 hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 2 μm. It was confirmed by the X-ray diffraction device that a peak of original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by ICP emission spectral analysis. An all-solid-state battery was fabricated in the same manner as Example 1 except that the first intermediate layer material and the second intermediate layer material, which were fabricated in this way, were used.

Example 31

Fabrication of First Intermediate Layer Material and Second Intermediate Layer Material As the first intermediate layer material and the second intermediate layer material, the amorphous $Li_3V_2(PO_4)_3$ fabricated through the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 hours by a ball mill using ethanol as a solvent, and then, dried to obtain the positive electrode active material powder. The average particle diameter of the powder was 0.3 μm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for 6 hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 3 μm. It was confirmed by an X-ray diffraction device that a peak of original $Li_3V_2(PO_4)_3$ was disappeared from the fabricated powder, no clear diffraction phenomenon was confirmed, and the powder was amorphous $Li_3V_2(PO_4)_3$ powder. In addition, the composition was confirmed by ICP emission spectral analysis. An all-solid-state battery was fabricated in the same manner as Example 1 except that the first intermediate layer material and the second intermediate layer material, which were fabricated in this way, were used.

Examples 32, 36, 40 and 44

Fabrication of First Intermediate Layer Material and Second Intermediate Layer Material As the first intermediate layer material and the second intermediate layer material, the amorphous $Li_3V_2(PO_4)_3$ fabricated through the following method was used. $Li_2CO_3$, $V_2O_5$ and $NH_4H_2PO_4$ were used as starting materials, weighed to become a mole ratio of 3:2:6, wet-blended for 16 hours by a ball mill using water as a solvent, and then, hydrated and dried. The obtained powder was calcined at 850° C. for two hours in a nitrogen-hydrogen mixed gas. The calcined product was roughly crushed, wet-ground for 24 times by a ball mill using ethanol as a solvent, and then, dried to obtain the positive electrode active material powder. The average particle diameter of the powder was 0.3 μm. It was confirmed using an X-ray diffraction device that the fabricated powder was $Li_3V_2(PO_4)_3$.

After that, the obtained $Li_3V_2(PO_4)_3$ powder was input into an alumina crucible and calcined at 700° C. for one hour in an air gas. The calcined product was roughly crushed, wet-ground for four hours by a ball mill using ethanol as a solvent, and then, passed through a mesh path and dried by an explosion-proof dryer, and the dried powder was cracked and passed through the mesh path to obtain the first intermediate layer material and the second intermediate layer material. The average particle diameter of the powder was 5 μm. It was confirmed by an X-ray diffraction device that a peak of original $Li_3V_2(PO_4)_3$ was disappeared from the fabricated powder, no clear diffraction phenomenon was not confirmed, and the powder was amorphous $Li_3V_2(PO_4)_3$ powder. In addition, the composition was confirmed by ICP emission spectral analysis. An all-solid-state battery was fabricated in the same manner as Example 1, Example 13, Example 16 and Example 19 except that the first intermediate layer material and the second intermediate layer material, which were fabricated in this way, were used.

Comparative Example 1

An all-solid-state battery was fabricated in the same manner as Example 1 except that the first intermediate layer and the second intermediate layer were not provided.

Comparative Example 2

An all-solid-state battery was fabricated in the same manner as Example 13 except that the first intermediate layer and the second intermediate layer were not provided.

Comparative Example 3

An all-solid-state battery was fabricated in the same manner as Example 16 except that the first intermediate layer and the second intermediate layer were not provided.

Comparative Example 4

An all-solid-state battery was fabricated in the same manner as Example 19 except that the first intermediate layer and the second intermediate layer were not provided.

(Estimation of Cycling Characteristics)

The terminal electrodes of the all-solid-state battery fabricated in Examples 1 to 44 and Comparative examples 1 to 4 were attached to a jig fixed by a spring pin.

The all-solid-state batteries of Examples 1 to 12 and 22 to 32, and Comparative example 1 were charged to a cutoff voltage of 2.6 V at a constant current of 1 μA, and then, discharged to a cutoff voltage of 0 V at a constant current of 1 μA. This was repeated 100 cycles. A capacity retention rate after 100 cycles was measured, and cycling characteristics were estimated.

Here, the capacity retention rate was calculated as 1-(discharge capacity after 100 cycles/discharge capacity after 1 cycle)×100.

The all-solid-state batteries of Examples 13 to 15 and 33 to 36, and Comparative example 2 were charged to a cutoff voltage of 2.8 V at a constant current of 1 μA, and then, discharged to a cutoff voltage of 1.8 V at a constant current of 1 μA. This was repeated 100 cycles. The capacity retention rate after 100 cycles was measured, and cycling characteristics were estimated.

The all-solid-state batteries of Example 16 to 18 and 37 to 40, and Comparative example 3 were charged to a cutoff voltage of 2.8 V at a constant current of 1 μA, and then, discharged to a cutoff voltage of 1.9 V at a constant current of 1 μA. This was repeated 100 cycles. The capacity retention rate after 100 cycles was measured, and cycling characteristics were estimated.

The all-solid-state batteries of Example 19 to 21 and 41 to 44, and Comparative example 4 were charged to a cutoff voltage of 3.2 V at a constant current of 1 μA, and then, discharged to a cutoff voltage of 2.5 V at a constant current of 1 μA. This was repeated 100 cycles. The capacity retention rate after 100 cycles was measured, and cycling characteristics were estimated.

Bonding rates and capacity retention rates related to Examples 1 to 44 and Comparative examples 1 to 4 are shown in Table 1 and Table 2.

TABLE 1

| | Positive electrode active material | Negative electrode active material | Thickness of first intermediate layer (μm) | Thickness of second intermediate layer (μm) | Bonding rate of first intermediate layer (%) | Bonding rate of second intermediate layer (%) | Capacity retention rate (%) |
|---|---|---|---|---|---|---|---|
| Example 1 | $Li_3V_2(PO_4)_3$ | $Li_3V_2(PO_4)_3$ | 0.5 | 0.5 | 81 | 82 | 84 |
| Example 2 | $Li_3V_2(PO_4)_3$ | $Li_3V_2(PO_4)_3$ | 0.5 | — | 81 | 0 | 78 |
| Example 3 | $Li_3V_2(PO_4)_3$ | $Li_3V_2(PO_4)_3$ | — | 0.5 | 0 | 82 | 78 |
| Example 4 | $Li_3V_2(PO_4)_3$ | $Li_3V_2(PO_4)_3$ | 0.5 | 0.5 | 95 | 94 | 88 |
| Example 5 | $Li_3V_2(PO_4)_3$ | $Li_3V_2(PO_4)_3$ | 0.5 | 0.5 | 73 | 74 | 79 |

TABLE 1-continued

|  | Positive electrode active material | Negative electrode active material | Thickness of first intermediate layer (μm) | Thickness of second intermediate layer (μm) | Bonding rate of first intermediate layer (%) | Bonding rate of second intermediate layer (%) | Capacity retention rate (%) |
|---|---|---|---|---|---|---|---|
| Example 6 | $Li_3V_2(PO_4)_3$ | $Li_3V_2(PO_4)_3$ | 0.5 | 0.5 | 60 | 61 | 77 |
| Example 7 | $Li_3V_2(PO_4)_3$ | $Li_3V_2(PO_4)_3$ | 0.5 | 0.5 | 50 | 51 | 75 |
| Example 8 | $Li_3V_2(PO_4)_3$ | $Li_3V_2(PO_4)_3$ | 0.5 | 0.5 | 35 | 34 | 72 |
| Example 9 | $Li_3V_2(PO_4)_3$ | $Li_3V_2(PO_4)_3$ | 0.5 | 0.5 | 25 | 25 | 67 |
| Example 10 | $Li_3V_2(PO_4)_3$ | $Li_3V_2(PO_4)_3$ | 0.5 | 0.5 | 12 | 12 | 65 |
| Example 11 | $Li_3V_2(PO_4)_3$ | $Li_3V_2(PO_4)_3$ | 0.5 | 0.5 | 5 | 7 | 63 |
| Example 12 | $Li_3V_2(PO_4)_3$ | $Li_3V_2(PO_4)_3$ | 0.5 | 0.5 | 1 | 1 | 60 |
| Example 13 | $Li_3V_2(PO_4)_3$ | $Li_4Ti_5O_{12}$ | 0.5 | 0.5 | 81 | 80 | 81 |
| Example 14 | $Li_3V_2(PO_4)_3$ | $Li_4Ti_5O_{12}$ | 0.5 | — | 81 | 0 | 77 |
| Example 15 | $Li_3V_2(PO_4)_3$ | $Li_4Ti_5O_{12}$ | — | 0.5 | 0 | 80 | 76 |
| Example 16 | $LiCoO_2$ | $Li_3V_2(PO_4)_3$ | 0.5 | 0.5 | 79 | 81 | 82 |
| Example 17 | $LiCoO_2$ | $Li_3V_2(PO_4)_3$ | 0.5 | — | 79 | 0 | 79 |
| Example 18 | $LiCoO_2$ | $Li_3V_2(PO_4)_3$ | — | 0.5 | 0 | 81 | 77 |
| Example 19 | $LiCoPO_4$ | $Li_3V_2(PO_4)_3$ | 0.5 | 0.5 | 81 | 81 | 83 |
| Example 20 | $LiCoPO_4$ | $Li_3V_2(PO_4)_3$ | 0.5 | — | 81 | 0 | 79 |
| Example 21 | $LiCoPO_4$ | $Li_3V_2(PO_4)_3$ | — | 0.5 | 0 | 81 | 78 |
| Comparative example 1 | $Li_3V_2(PO_4)_3$ | $Li_3V_2(PO_4)_3$ | — | — | 0 | 0 | 49 |
| Comparative example 2 | $Li_3V_2(PO_4)_3$ | $Li_4Ti_5O_{12}$ | — | — | 0 | 0 | 38 |
| Comparative example 3 | $LiCoO_2$ | $Li_3V_2(PO_4)_3$ | — | — | 0 | 0 | 43 |
| Comparative example 4 | $LiCoPO_4$ | $Li_3V_2(PO_4)_3$ | — | — | 0 | 0 | 44 |

TABLE 2

|  | Positive electrode active material | Negative electrode active material | Thickness of first intermediate layer (μm) | Thickness of second intermediate layer (μm) | Bonding rate of first intermediate layer (%) | Bonding rate of second intermediate layer (%) | Capacity retention rate (%) |
|---|---|---|---|---|---|---|---|
| Example 22 | $Li_3V_2(PO_4)_3$ | $Li_3V_2(PO_4)_3$ | 0.1 | 0.1 | 82 | 82 | 84 |
| Example 23 | $Li_3V_2(PO_4)_3$ | $Li_3V_2(PO_4)_3$ | 0.2 | 0.2 | 82 | 82 | 86 |
| Example 24 | $Li_3V_2(PO_4)_3$ | $Li_3V_2(PO_4)_3$ | — | 0.2 | 0 | 82 | 85 |
| Example 25 | $Li_3V_2(PO_4)_3$ | $Li_3V_2(PO_4)_3$ | 1 | 1 | 82 | 82 | 84 |
| Example 26 | $Li_3V_2(PO_4)_3$ | $Li_3V_2(PO_4)_3$ | 1 | — | 82 | 0 | 82 |
| Example 27 | $Li_3V_2(PO_4)_3$ | $Li_3V_2(PO_4)_3$ | 2 | 2 | 82 | 82 | 82 |
| Example 28 | $Li_3V_2(PO_4)_3$ | $Li_3V_2(PO_4)_3$ | — | 2 | 0 | 82 | 81 |
| Example 29 | $Li_3V_2(PO_4)_3$ | $Li_3V_2(PO_4)_3$ | 5 | 5 | 82 | 82 | 79 |
| Example 30 | $Li_3V_2(PO_4)_3$ | $Li_3V_2(PO_4)_3$ | 10 | 10 | 82 | 82 | 76 |
| Example 31 | $Li_3V_2(PO_4)_3$ | $Li_3V_2(PO_4)_3$ | 12 | 12 | 82 | 82 | 72 |
| Example 32 | $Li_3V_2(PO_4)_3$ | $Li_3V_2(PO_4)_3$ | 20 | 20 | 82 | 82 | 67 |
| Example 33 | $Li_3V_2(PO_4)_3$ | $Li_4Ti_5O_{12}$ | 0.2 | 0.2 | 82 | 81 | 80 |
| Example 34 | $Li_3V_2(PO_4)_3$ | $Li_4Ti_5O_{12}$ | 1 | 1 | 82 | 81 | 80 |
| Example 35 | $Li_3V_2(PO_4)_3$ | $Li_4Ti_5O_{12}$ | 5 | 5 | 82 | 81 | 77 |
| Example 36 | $Li_3V_2(PO_4)_3$ | $Li_4Ti_5O_{12}$ | 20 | 20 | 82 | 81 | 66 |
| Example 37 | $LiCoO_2$ | $Li_3V_2(PO_4)_3$ | 0.2 | 0.2 | 80 | 82 | 81 |
| Example 38 | $LiCoO_2$ | $Li_3V_2(PO_4)_3$ | 1 | 1 | 80 | 82 | 81 |
| Example 39 | $LiCoO_2$ | $Li_3V_2(PO_4)_3$ | 5 | 5 | 80 | 82 | 76 |
| Example 40 | $LiCoO_2$ | $Li_3V_2(PO_4)_3$ | 20 | 20 | 80 | 82 | 65 |
| Example 41 | $LiCoPO_4$ | $Li_3V_2(PO_4)_3$ | 0.2 | 0.2 | 81 | 82 | 82 |
| Example 42 | $LiCoPO_4$ | $Li_3V_2(PO_4)_3$ | 1 | 1 | 81 | 82 | 81 |
| Example 43 | $LiCoPO_4$ | $Li_3V_2(PO_4)_3$ | 5 | 5 | 81 | 82 | 76 |
| Example 44 | $LiCoPO_4$ | $Li_3V_2(PO_4)_3$ | 20 | 20 | 81 | 82 | 66 |

In the all-solid-state batteries fabricated in Examples 1 to 44, the all-solid-state batteries having high capacity retention rates and excellent cycling characteristics were obtained. Meanwhile, in the all-solid-state batteries of Comparative examples 1 to 4, a remarkable decrease in capacity retention rate was confirmed.

INDUSTRIAL APPLICABILITY

As described above, the all-solid-state battery according to the present invention is effective in improvement of cycling characteristics. By providing the all-solid-state battery with improved cycling characteristics, it will make a significant contribution especially in the field of energy and electronics.

REFERENCE SIGNS LIST

50 All-solid-state battery
51 Positive electrode current collector layer
52 Positive electrode active material layer
53 Negative electrode current collector layer
54 Negative electrode active material layer
55 Solid electrolyte layer 56 First intermediate layer
57 Second intermediate layer
58 Terminal electrode
10 Electricity storage part
11 Positive electrode current collector layer
12 Positive electrode active material layer
13 Negative electrode current collector layer
14 Negative electrode active material layer
15 Solid electrolyte layer
16 First intermediate layer
17 Second intermediate layer

The invention claimed is:

1. An all-solid-state battery comprising:
a positive electrode current collector layer;
a positive electrode active material layer;
a negative electrode current collector layer;
a negative electrode active material layer;
a solid electrolyte layer disposed between the positive electrode active material layer and the negative electrode active material layer and formed of a solid electrolyte; and
both of (i) a first intermediate layer formed between the positive electrode current collector layer and the positive electrode active material layer, and (ii) a second intermediate layer formed between the negative electrode current collector layer and the negative electrode active material layer,
wherein the first intermediate layer and the second intermediate layer contain amorphous $Li_3V_2(PO_4)_3$.

2. The all-solid-state battery according to claim 1, wherein a bonding rate by which the first intermediate layer or the second intermediate layer is bonded to the positive electrode current collector layer or the negative electrode current collector layer is greater than 1%.

3. The all-solid-state battery according to claim 2, wherein the bonding rate is greater than 30%.

4. The all-solid-state battery according to claim 1, wherein a thickness of the first intermediate layer or the second intermediate layer is 0.1 µm or more and 10 µm or less.

5. The all-solid-state battery according to claim 2, wherein a thickness of the first intermediate layer or the second intermediate layer is 0.1 µm or more and 10 µm or less.

6. The all-solid-state battery according to claim 3, wherein a thickness of the first intermediate layer or the second intermediate layer is 0.1 µm or more and 10 µm or less.

7. The all-solid-state battery according to claim 1, wherein a particle diameter of the solid electrolyte is 0.05 µm or more and 5 µm or less.

8. The all-solid-state battery according to claim 1, wherein the all-solid-state battery is a sintered body.

* * * * *